(12) United States Patent
Fujii

(10) Patent No.: US 9,552,178 B2
(45) Date of Patent: Jan. 24, 2017

(54) PRINTING SYSTEM AND IMAGE FORMING APPARATUS

(71) Applicant: KONICA MINOLTA, INC., Chiyoda-ku, Tokyo (JP)

(72) Inventor: Masato Fujii, Nagaokakyo (JP)

(73) Assignee: KONICA MINOLTA, INC., Chiyoda-Ku, Tokyo (JP)

( * ) Notice: Subject to any disclaimer, the term of this patent is extended or adjusted under 35 U.S.C. 154(b) by 0 days.

(21) Appl. No.: 14/855,458

(22) Filed: Sep. 16, 2015

(65) Prior Publication Data
US 2016/0085483 A1  Mar. 24, 2016

(30) Foreign Application Priority Data
Sep. 19, 2014 (JP) ................. 2014-191229

(51) Int. Cl.
G06F 3/12 (2006.01)
(52) U.S. Cl.
CPC ............. G06F 3/121 (2013.01); G06F 3/126 (2013.01); G06F 3/1224 (2013.01); G06F 3/1234 (2013.01); G06F 3/1286 (2013.01); G06F 2206/1508 (2013.01)
(58) Field of Classification Search
USPC ...................................... 358/1.15
See application file for complete search history.

(56) References Cited

U.S. PATENT DOCUMENTS

| | | | |
|---|---|---|---|
| 4,760,534 A * | 7/1988 | Fougere | G06Q 20/363 235/375 |
| 5,841,991 A * | 11/1998 | Russell | H04L 29/06 709/216 |
| 2007/0097416 A1* | 5/2007 | Higashimura | G06F 3/1285 358/1.15 |
| 2010/0066839 A1* | 3/2010 | Azuma | G11B 27/034 348/207.1 |

FOREIGN PATENT DOCUMENTS

JP  2007-208826 A  8/2007

* cited by examiner

Primary Examiner — Jerome Grant, II
(74) Attorney, Agent, or Firm — Buchanan Ingersoll & Rooney PC

(57) ABSTRACT

A printing system includes a distribution apparatus, print servers, and an image forming apparatus. Upon each reception of print data, the distribution apparatus distributes the print data to one print server, the print server creates a print job from the print data and transmits the print job to the image forming apparatus, and the image forming apparatus executes the print job. Each print server includes an identifier addition unit adding identifier of the print server to a created print job, the image forming apparatus includes an exception event determination unit, upon reception of a print job from one print server, determining whether exception event has occurred in the print server based on identifier added to the print job, and the distribution apparatus includes an exclusion unit, when exception event has occurred in one print server, excluding the print server from candidates for distribution destination of a subsequent print job.

9 Claims, 14 Drawing Sheets

FIG. 6

| Server ID | Status |
|---|---|
| #0001 | ok |
| #0002 | ok |
| #0003 | ok |
| #0004 | Exception event |
| #0005 | ok |
| ... | ... |

PRINTING SYSTEM AND IMAGE FORMING APPARATUS

This application is based on application No. 2014-191229 filed in Japan, the contents of which are hereby incorporated by reference.

BACKGROUND OF THE INVENTION (1) Field of the Invention

The present invention relates to a printing system and an image forming apparatus, and particularly to a fault tolerance technique that maintains normal operations of the printing system in which a plurality of print servers are used irrespective of whether a failure has occurred in any of the print servers.

(2) Description of the Related Art

Recently, in a printing system in which a print job is transmitted from a user terminal such as a personal computer (PC) to an image forming apparatus via a print server, an art has been put in practical use for speeding up image forming processing by using a load balancer to distribute print data to a plurality of print servers to reduce processing load on each of the print servers.

However, even if the processing load on each of the print server is reduced, in the case where a communication failure has occurred on a network in which user terminals, print servers, and image forming apparatuses are connected to each other, it is difficult to perform smooth image forming processing. This causes a problem that the availability of the printing system deteriorates.

In order to solve this problem, there has been proposed for example an art of checking whether or not a network failure occurs by monitoring a period necessary for transmission and reception of an e-mail via the network (for example, Japanese Patent Application Publication No. 2007-208826). According to this art, it is possible to accelerate specification of the cause for the network failure by monitoring whether or not a network failure has occurred.

Malfunction in the printing system is sometimes caused not only due to a network failure but also due to an exception event of a print server itself. There has been conventionally known an art of detecting an exception event of operating system (OS) in hardware of a print server by the print server or a monitoring system that is provided separately from the print server.

However, it is difficult to promptly deal with a failure because of no monitoring of an application level exception event relevant to primary functions of the print server. As a result, when an application level exception event has occurred, a user needs to continue to use the print server in which the exception event has occurred. This impairs the user's convenience.

SUMMARY OF THE INVENTION

The present invention was made in view of the above problem, and aims to provide a printing system that is capable of continuing to normally operate while using a plurality of print servers, even if an exception event has occurred in any of the print servers, and an image forming apparatus included therein.

In order to achieve the above aim, one aspect of the present invention provides a printing system that includes a distribution apparatus, a plurality of print servers, and an image forming apparatus, where each time the distribution apparatus receives print data, the distribution apparatus distributes the print data to one of the print servers, the print server creates a print job from the print data and transmits the print job to the image forming apparatus, and the image forming apparatus executes the print job, wherein the print servers each comprise an identifier addition unit that adds an identifier of the print server to a created print job, the image forming apparatus comprises an exception event determination unit that, upon reception of a print job from one of the print servers, determines whether or not an exception event has occurred in the print server based on an identifier added to the print job, and the distribution apparatus comprises an exclusion unit that, when the exception event determination unit determines that an exception event has occurred in one of the print servers, excludes the print server from candidates for a distribution destination of a subsequent print job.

BRIEF DESCRIPTION OF THE DRAWINGS

These and other objects, advantages and features of the invention will become apparent from the following description thereof taken in conjunction with the accompanying drawings those illustrate a specific embodiments of the invention.

In the drawings:

FIG. 6 shows an example of a table of records in an exception event recording unit 503 included in the load balancer 101;

DESCRIPTION OF EMBODIMENTS

The following explains an embodiment of a printing system and an image forming apparatus relating to the present invention with reference to the drawings.

[1] Configuration of the Printing System

Firstly, a configuration of a printing system relating to the present embodiment is explained.

Figure 1:
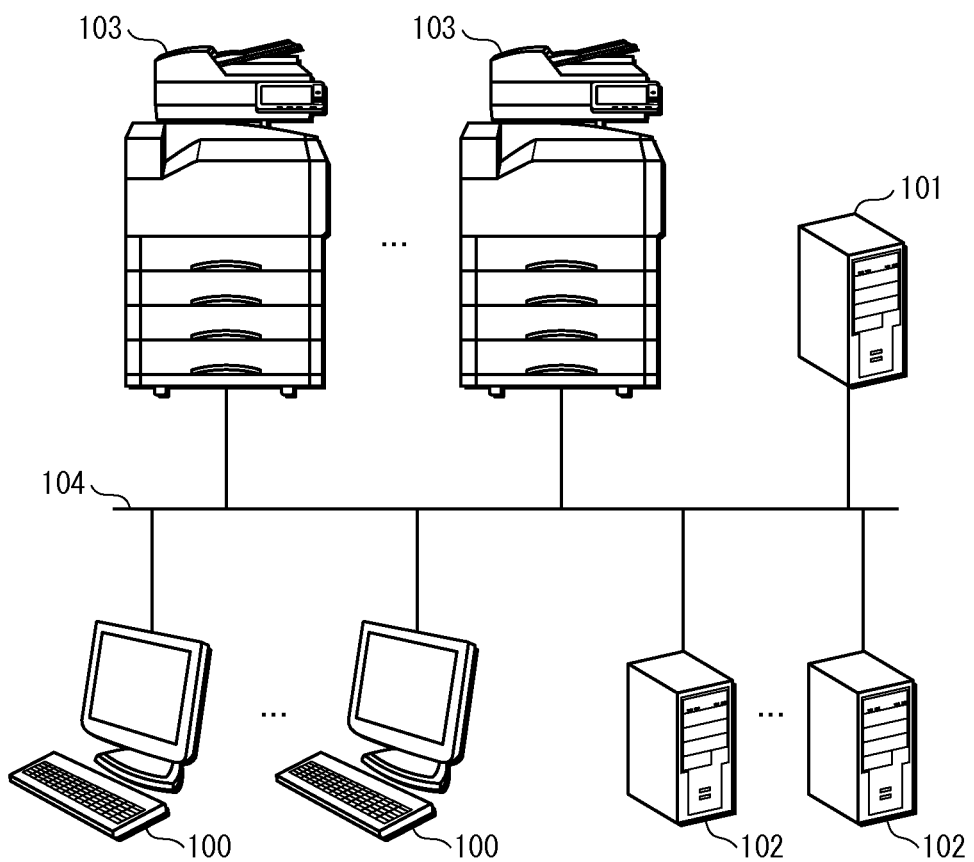
FIG. 1 shows a configuration of main elements of a printing system relating to an embodiment of the present invention.

As shown in FIG. 1, the printing system 1 is a system in which a user terminal 100 such as a PC, a load balancer 101, a print server 102, and an image forming apparatus 103 that are connected to each other via a local area network (LAN) 104 so as to intercommunicate with each other. Here, the user terminal 100, the print server 102, and the image forming apparatus 103 are each provided in plural and are each connected to the LAN 104.

Application software such as a word processor is installed in each of the user terminals 100. A user can create print data (application data) with use of this software, and transmit the print data to the load balancer 101.

Upon receiving the print data from the user terminal 100, the load balancer 101 distributes the print data to one of the print servers 102. The load balancer 101 relating to the present embodiment monitors processing load on each of the print servers 102, and selects one of the print servers 102 as a distribution destination such that excessive processing delay does not occur due to uneven distribution of the processing load on the print servers 102.

Upon receiving the print data from the load balancer 101, the print server 102 creates a print job, and transmits the print job to one of the image forming apparatuses 103. The image forming apparatus 103 executes the print job, which is received from the print server 102.

[2] Operation Sequence of the Printing System 1

The following explains an operation sequence of the printing system 1.

Figure 2:
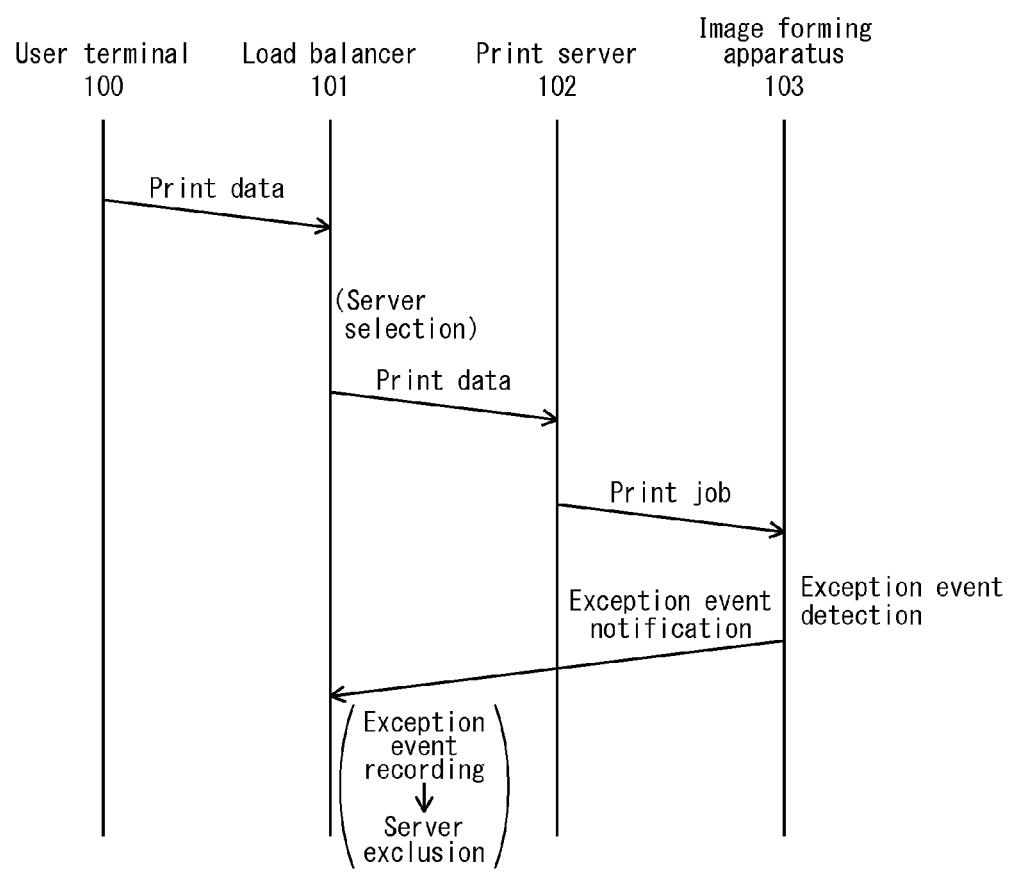
FIG. 2 shows an operation sequence of a printing system 1.

FIG. 2 shows the operation sequence of the printing system 1. As shown in FIG. 2, when the user terminal 100 transmits print data to the load balancer 101, the load balancer 101 selects one of the print servers 102 as a distribution destination of the print data, and distributes the print data to the selected print server 102.

The print server 102 creates a print job from the print data, which is received from the load balancer 101, and transmits the created print job to one of the image forming apparatuses 103. The image forming apparatus 103 executes the print job, which is received from the print server 102.

Also, the image forming apparatus 103 detects, for each print job, whether or not an application level exception event has occurred in one of the print servers 102 that has transmitted the print job. When detecting occurrence of an exception event, the image forming apparatus 103 transmits an exception event notification to the load balancer 101.

Upon receiving the exception event notification from the image forming apparatus 103, the load balancer 101 records therein the print server 102 with respect to which occurrence of the exception event is detected. Then, the load balancer 101 excludes the print server 102 from candidates for a distribution destination of print data to be received from the user terminal 100.

With this configuration, if an application level exception event has occurred in one of the print servers 102, no print data is distributed anymore to the print server 102 in which the exception event has occurred. Therefore, it is possible to continue normal operations of the printing system 1.

[3] Configuration and Operations of the User Terminal 100

The following explains in detail the configurations and operations of the user terminal 100.

(3-1) Configuration of the User Terminal 100

Figure 3:
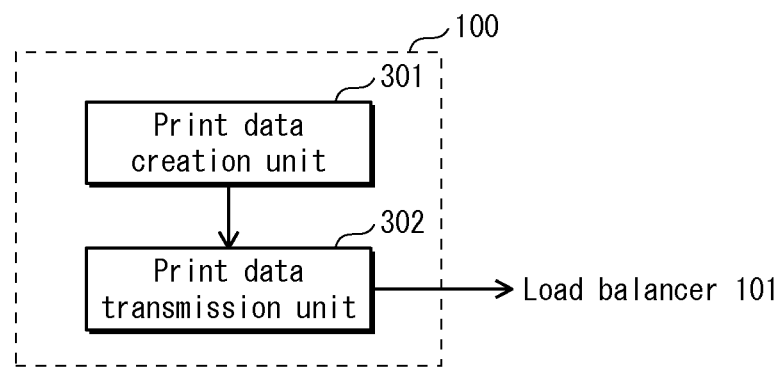
FIG. 3 is a block diagram showing a configuration of main elements of a user terminal 100.

As shown in FIG. 3, the user terminal 100 includes a print data creation unit 301 and a print data transmission unit 302. The print data creation unit 301 creates print data by application software in accordance with user operations made in the user terminal 100. The print data transmission unit 302 transmits the print data, which is created by the print data creation unit 301, to the load balancer 101 in accordance with user operations.

The user terminal 100 is for example a PC. Alternatively, a device other than a PC may be used as the user terminal 100.

(3-2) Operations of the User Terminal 100

Figure 4:
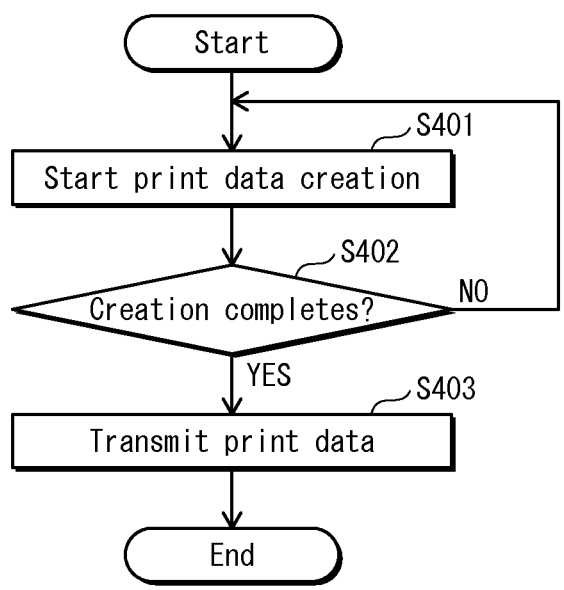
FIG. 4 is a flow chart showing main operations of the user terminal 100.

FIG. 4 is a flow chart showing main operations of the user terminal 100. As shown in FIG. 4, the user terminal 100 starts creating print data (S401). When completing creation of the print data (S402: YES), the user terminal 100 transmits the print data to the load balancer 101 (S403), and ends processing.

[4] Configuration and Operations of Load Balancer 101

The following explains the configurations and operations of the load balancer 101.

(4-1) Configuration of the Load Balancer 101

Figure 5:
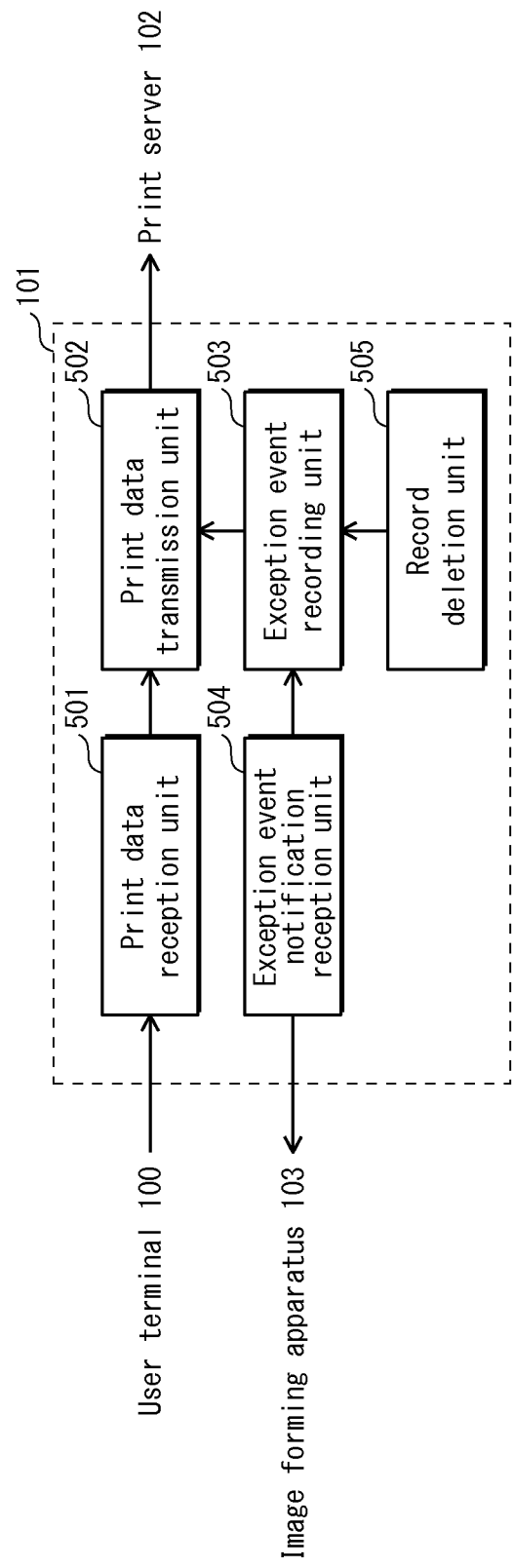
FIG. 5 is a block diagram showing a configuration of main elements of a load balancer 101.

As shown in FIG. 5, the load balancer 101 includes a print data reception unit 501, a print data transmission unit 502, an exception event recording unit 503, an exception event notification reception unit 504, and a record deletion unit 505. The print data reception unit 501 receives print data from the user terminal 100. The print data transmission unit 502 transmits the print data, which is received from the user terminal 100, to the print server 102.

The print data transmission unit 502 selects one of the print servers 102 as a transmission destination of the print data, with reference to the exception event recording unit 503. The exception event recording unit 503 records therein the print server 102 with respect to which an exception event notification has been received by the exception event notification reception unit 504 form the image forming apparatus 103. FIG. 6 shows an example of a table of records in the exception event recording unit 503.

An exception event notification, which is received by the exception event notification reception unit 504, has added thereto a server identification (ID) of the print server 102 with respect to which occurrence of an exception event is detected. The exception event recording unit 503 records therein as to whether or not an exception event notification has been received for each server ID. In FIG. 6, with respect to the print server 102 whose exception event notification has been received by the exception event notification reception unit 504, sign "exception event" is recorded, whereas with respect to each of the print servers 102 whose exception event notifications have not been received by the exception event notification reception unit 504, sign "ok" is recorded.

The print data transmission unit 502 selects the print server 102 to which print data is to be transmitted in ascending order of server IDs in a so-called round-robin manner. In this case, the print data transmission unit 502 checks whether or not an exception event notification has been received with respect to a next server ID that is following a server ID of the print server 102 that is an immediately previous transmission destination of print data, with reference to the exception event recording unit 503.

In the case where the exception event recording unit 503 records therein reception of an exception event notification with respect to the next server ID, the print data transmission unit 502 excludes the next server ID, and checks whether or not reception of an exception event notification is recorded with respect to a further next server ID that is following the next server ID. When finding a server ID with respect to which reception of an exception event notification is not recorded after repeating this processing, the print data transmission unit 502 transmits print data to the print server 102 having the server ID with respect to which reception of an exception event notification is not recorded.

When it is confirmed that the print server 102 with respect to which an exception event notification has been received recovers from the exception event status to the normal status, the record deletion unit 505 notifies the exception event recording unit 503 of the confirmation. Upon receiving the notification, the exception event recording unit 503 deletes the record of reception of the exception event notification having added thereto the server ID of the recovered print server 102. With this configuration, the print server 102, which is confirmed to have recovered to the normal status, is returned to the candidates for a transmission destination of subsequent print data from the print data transmission unit 502.

(4-2) Operations of Load Balancer 101

Figure 7:
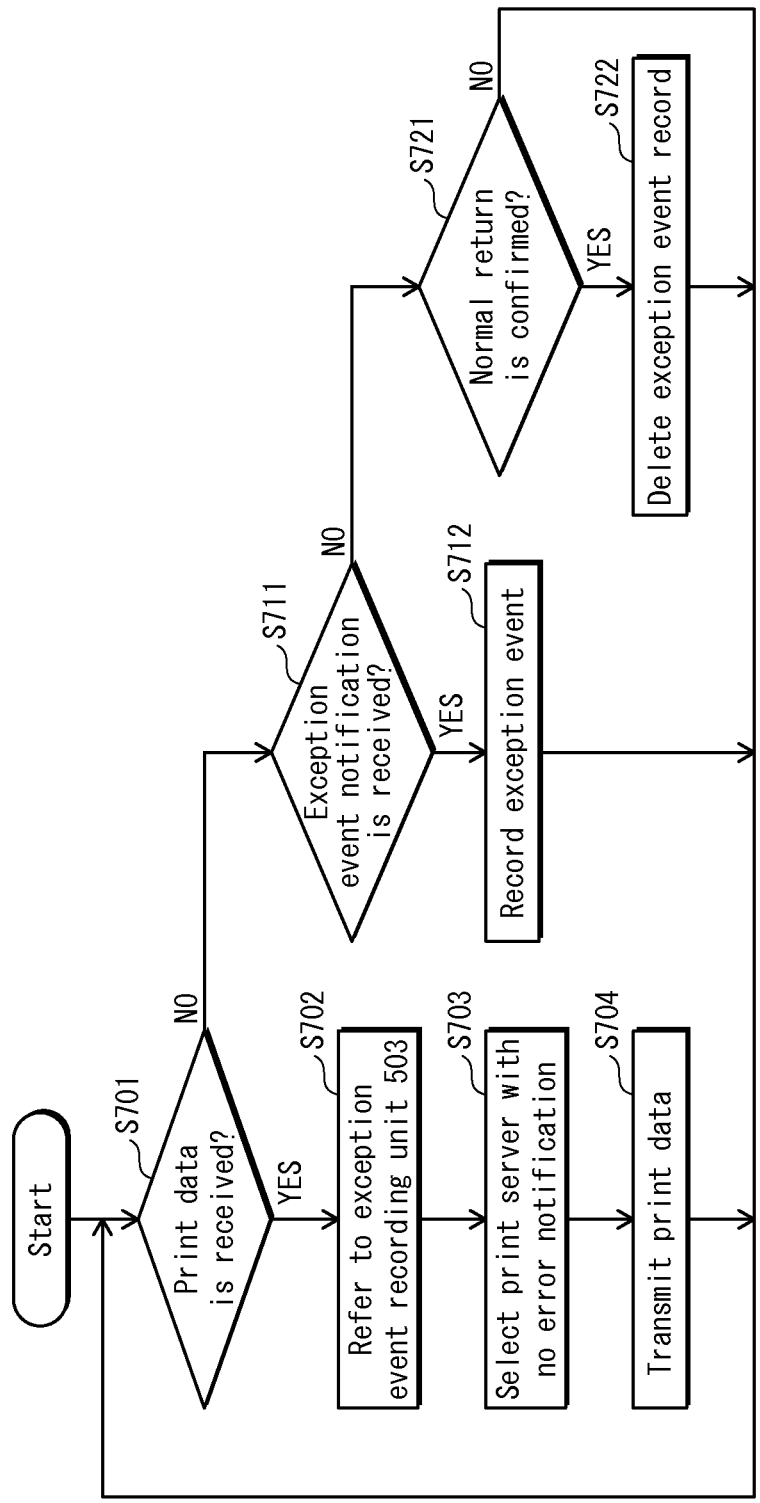
FIG. 7 is a flow chart showing main operations of the load balancer 101.

FIG. 7 is a flow chart showing main operations of the load balancer 101. As shown in FIG. 7, when the print data reception unit 501 included in the load balancer 101 receives print data from the user terminal 100 (S701: YES), the print data transmission unit 502 refers to the exception event recording unit 503 (S702) to select one of the print servers 102 with respect to which an exception event notification has not been received (S703). Then, the print data transmission unit 502 transmits the print data to the selected print server 102 (S704).

When receiving an exception event notification from the image forming apparatus 104 (S711: YES), the exception event notification reception unit 504 notifies the exception event recording unit 503 of a server ID that is added to the exception event notification. The exception event recording unit 503 records therein reception of the exception event notification having added thereto the server ID (S712).

When it is confirmed that the print server 102 with respect to which an exception event notification has been received has recovered to the normal status (S721: YES), the record deletion unit 505 notifies the exception event recording unit 503 of recovery of the print server 102. Upon receiving the notification, the exception event recording unit 503 deletes the record of reception of the exception event notification (S722).

[5] Configuration and Operations of the Print Server 102

The following explains the configurations and operations of the print server 102.

(5-1) Configuration of the Print Server 102

Figure 8:
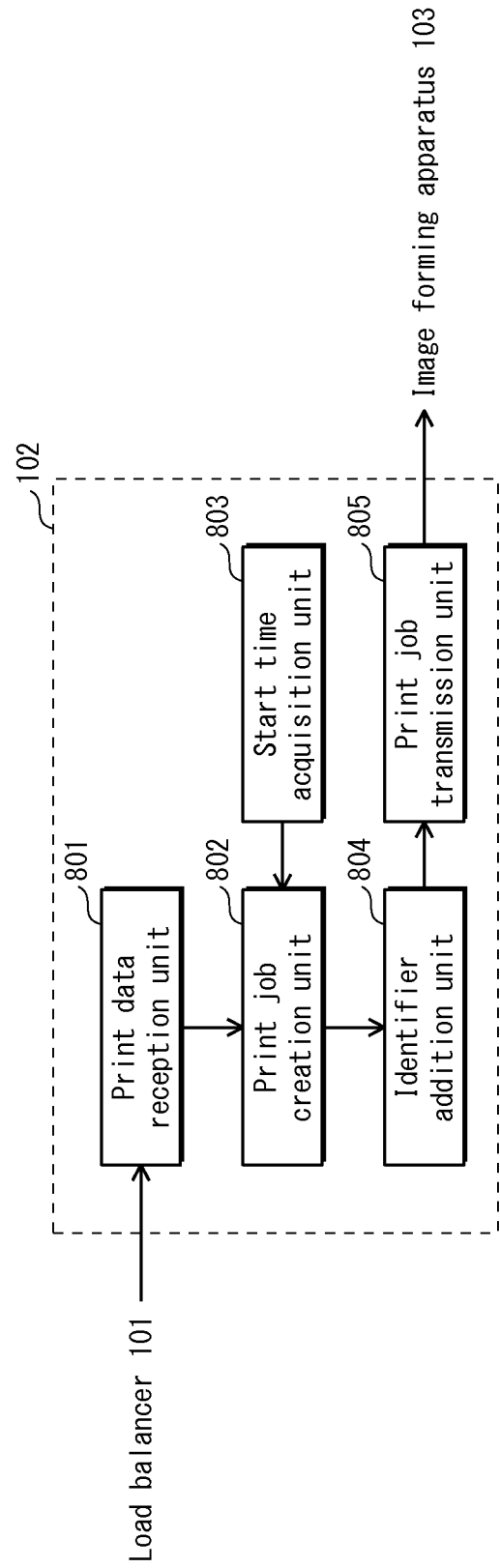
FIG. 8 is a block diagram showing a configuration of main elements of a print server 102.

As shown in FIG. 8, the print server 102 includes a print data reception unit 801, a print job creation unit 802, a start time acquisition unit 803, an identifier addition unit 804, and a print job transmission unit 805. The print data reception unit 801 receives print data from the load balancer 101.

The print job creation unit 802 creates a print job described in a page description language (PDL) from the received print data. Before creating the print job, the print job creation unit 802 acquires the current time from the start time acquisition unit 803 to add the acquired current time to the print job as a print job creation start time. This print job creation start time is used for calculating a period necessary for the print job creation unit 802 to create the print job.

The identifier addition unit 804 adds the server ID of the print server 102 to the print job created by the print job creation unit 802. When occurrence of an application level exception event in the print job is detected, this server ID is added to an exception event notification.

The print job transmission unit 805 transmits the print job, which has the server ID added thereto, to the image forming apparatus 103.

(5-2) Operations of the Print Server 102

Figure 9:
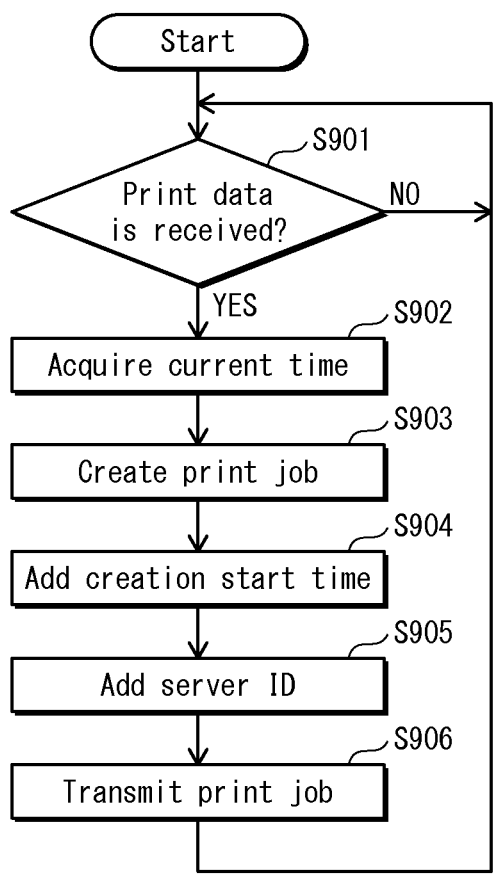
FIG. 9 is a flow chart showing main operations of the print server 102.

FIG. 9 is a flow chart showing main operations of the print server 102. As shown in FIG. 9, in the print server 102, when the print data reception unit 801 receives print data (S901: YES), the start time acquisition unit 803 acquires the current time (S902). Next, the print job creation unit 802 creates a print job from the print data, which is received by the print data reception unit 801 (S903), and adds the current time to the print job as a time print job creation start time (S904).

Furthermore, when the identifier addition unit 804 adds the server ID of the print server 102 to the print job (S905), the print job transmission unit 805 transmits the print job to the image forming apparatus 103 (S906).

[6] Configuration and Operations of the Image Forming Apparatus 103

The following explains the configuration and operations of image forming apparatus 103.

(6-1) Configuration of the Image Forming Apparatus 103

Figure 10:
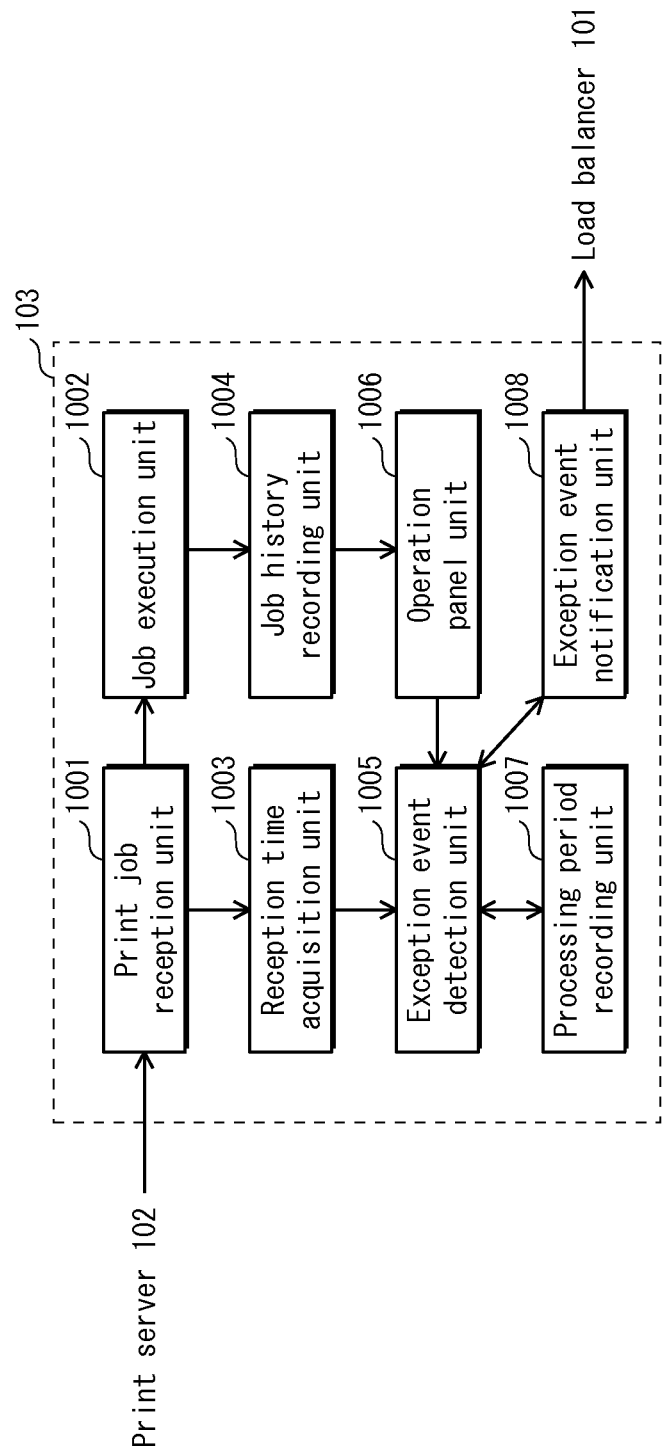
FIG. 10 is a block diagram showing a configuration of main elements of an image forming apparatus 103.

As shown in FIG. 10, the image forming apparatus 103 includes a print job reception unit 1001, a job execution unit 1002, a reception time acquisition unit 1003, a job history recording unit 1004, an exception event detection unit 1005, an operation panel unit 1006, a processing period recording unit 1007, and an exception event notification unit 1008.

The print job reception unit 1001 receives a print job from the print server 102. The job execution unit 1002 boots up each of the units included in the image forming apparatus 103 in accordance with the received print job, and manages completion of the print job (both normal termination and abnormal termination). Each time a print job ends, the job history recording unit 1004 records therein, as a job history of the print job, the details of the print job, type of termination of the print job, the server ID of the print server 102 that has created the print job, and so on.

Each time the print job reception unit 1001 receives a print job, the reception time acquisition unit 1003 notifies the exception event detection unit 1005 of the current time as a print job reception time. The exception event detection unit 1005 detects, for each print job, whether or not an application level exception event has occurred. The processing period recording unit 1007 records, for each of the print servers 102, a temporal difference between the print job creation start time and the print job reception time (hereinafter, referred to as a processing period).

Figure 11:
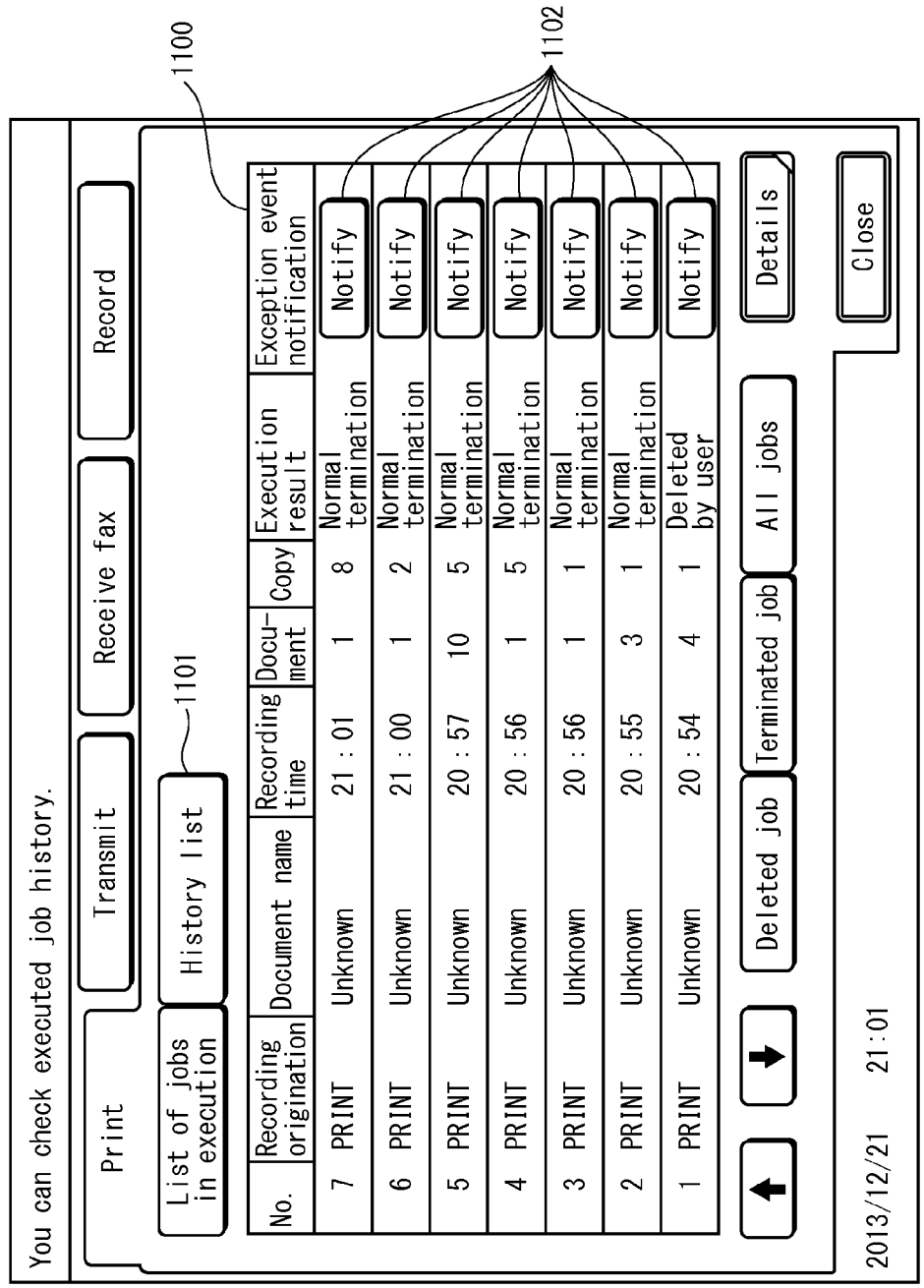
FIG. 11 shows an example of a history list displayed by an operation panel unit 1006.

The operation panel unit 1006 includes a so-called touch panel and hardware keys, and presents the user with information and receives instructions input by the user. FIG. 11 shows an example of a history list displayed by the operation panel unit 1006. As shown in FIG. 11, when a "History list" button 1101 is pressed by the user, the operation panel unit 1006 displays a history list 1100 that is a list of a history of executed print jobs.

Also, when a "Notify" button 1102 provided for each print job included in the history list 1100 is pressed by the user, the exception event notification unit 1008 transmits an exception event notification to the load balancer 101 to notify of the server ID of the print server 102 that has created the print job.

(6-2) Operations of the Image Forming Apparatus 103

Figure 12:
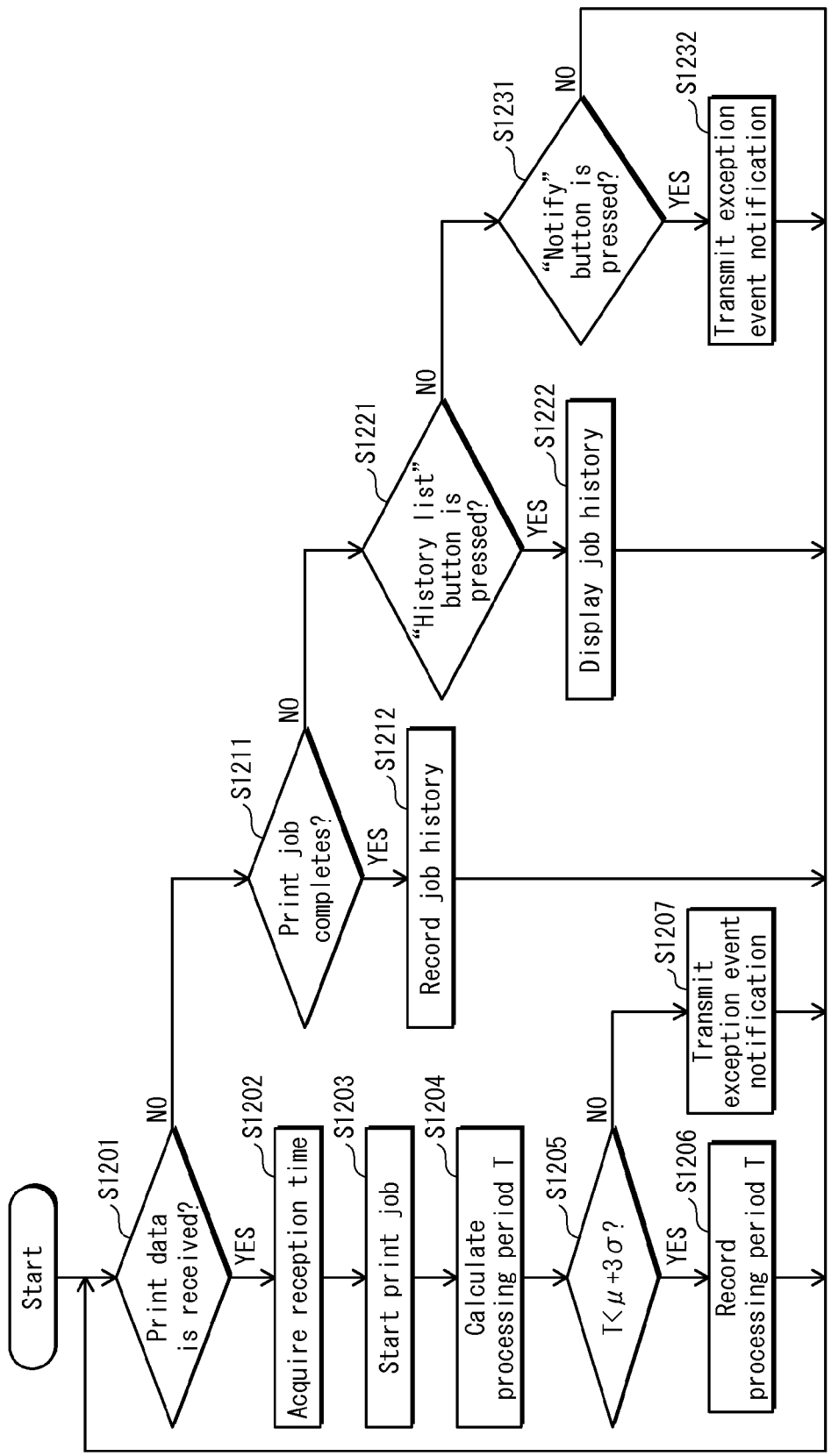
FIG. 12 is a flow chart showing main operations of the image forming apparatus 103.

FIG. 12 is a flow chart showing main operations of the image forming apparatus 103. As shown in FIG. 12, in the image forming apparatus 103, when the print job reception unit 1001 receives a print job (S1201: YES), the reception time acquisition unit 1003 acquires the current time as a print job reception time (S1202), and the job execution unit 1002 starts executing the print job (S1203).

Next, the exception event detection unit 1005 calculates a temporal difference (processing period) T between the print job reception time, which is acquired by the reception time acquisition unit 1003, and the print job creation start time, which is added to the print job (S1204).

Then, the exception event detection unit 1005 reads, from the processing period recording unit 1007, a past processing period of the print server 102 other than the print server 102 which has created the print job, and obtains a mean value μ and a standard deviation σ to calculate an upper period U by the following expression.

$$U=\mu+3\sigma$$

In the case where a normal processing period is normally distributed, 99% or more of the normal processing period falls within a range shown by the following Equation 2.

$$\mu\pm3\sigma$$

Accordingly, the processing period T, which exceeds the upper period U, is determined to be excessively too long.

When a newly calculated processing period T is equal to or shorter than the upper period U (S1205: YES), the newly calculated processing period T is regarded as falling within a normal range, and accordingly the processing period recording unit 1007 records therein the newly calculated processing period T (S1206).

When the newly calculated processing period T is longer than the upper period U (S1205: NO), the processing period in the print server 102 is regarded as being too long, and accordingly the exception event notification unit 1006 transmits, to the load balancer 101, an exception event notification that has added thereto a server ID which is added to the print job (S1207).

With this configuration, the print server 102 with respect to which occurrence of an exception event is detected is immediately excluded from candidates for a distribution destination of subsequent print data from the load balancer 101. This prevents an exception event from occurring again, thereby continuing normal operations of the printing system 1.

Then, when the job execution unit 1002 confirms termination (normal termination or abnormal termination) of the print job (S1211: YES), the job history recording unit 1004 records therein a job history of the print job (S1212).

Also, the "History list" button 1101 on a display screen is pressed (S1221: YES), the operation panel unit 1006 displays the display history list 1100 (S1222).

Furthermore, when the "Notify" button 1102 corresponding to any one of print jobs included in the history list 1100 is pressed (S1231: YES), the exception event notification unit 1008 transmits an exception event notification to the load balancer 101 notifying of the server ID of the print server 102 that has created the print job corresponding to the "Notify" button 1102 (S1232). Even with this configuration, the print server 102 with respect to which occurrence of an exception event is detected is immediately excluded from candidates for a distribution destination of subsequent print data, thereby continuing normal operations of the printing system 1.

[7] Operation Examples

The following shows operation examples of the printing system 1.

(7-1) Example of Normal Operations

First, an example of operations of transmitting a print job is shown.

Figure 13:
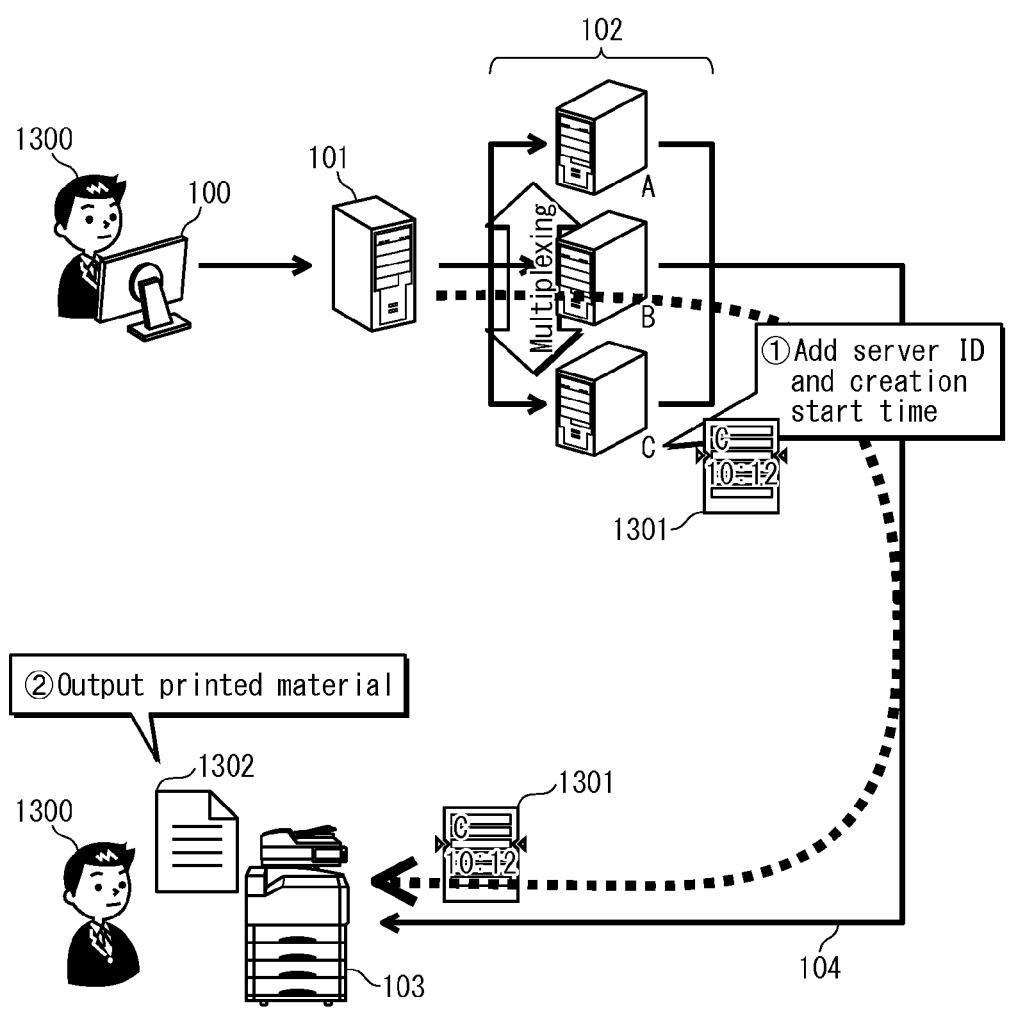
FIG. 13 shows an example of normal operations of the printing system 1.

As shown in FIG. 13, a user 1300 operates the user terminal 100 to create print data, and transmits the print data to the load balancer 101. Candidates for distribution destination of print data from the load balancer 101 include three print servers 102, namely, print servers 102A, 102B, and 102C. In this example, the load balancer 101 distributes print data to the print server 102C.

Upon receiving the print data, the print server 102C creates a print job 1301 from the print data, adds a server ID thereof and a creation start time of the print job 1301 to the print job 1301, and transmits the print job 1301 to the image forming apparatus 103.

Upon receiving the print job 1301 from the print server 102C, the image forming apparatus 103 executes the print job 1301 and outputs a printed material 1302.

In this case, the processing ends as long as occurrence of an exception event in the print server 102C is not detected.

(7-2) Examples of Operations in the Case where Occurrence of an Abnormality is Detected by the Image Forming Apparatus 103

The following explains an example of operations in the case where occurrence of an abnormality is detected by the image forming apparatus 103.

Figure 14:
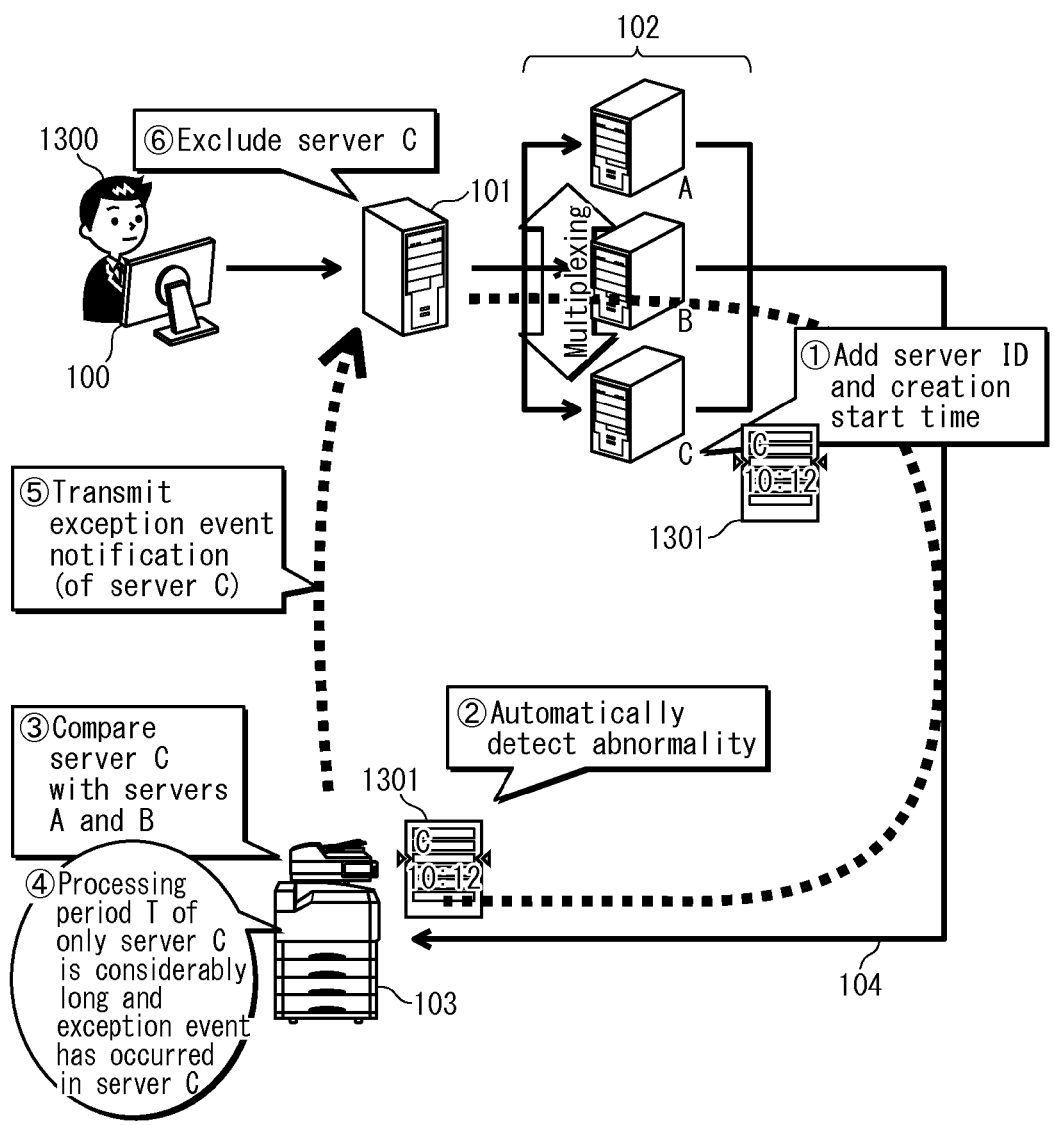
FIG. 14 shows an example of operations in the case where occurrence of an abnormality is detected by the image forming apparatus 103.

As shown in FIG. 14, when the print server 102C receives the print job 1301, which has added thereto the server ID of the print server 102C and the creation start time of the print job 1301, the image forming apparatus 103 calculates a temporal difference (processing period) T between a reception time of the print job 1301 and the creation start time of the print job 1301, as described above.

Next, in the case where the processing period T of the print server 102C is longer than the upper period U that is calculated from the processing periods of the print servers 102A and 102B recorded in the processing period recording unit 1007, it is determined that only the processing period T of the print server 102C is considerably long and the operations of the print server 102C are abnormal. Accordingly, the image forming apparatus 103 transmits an exception event notification to the load balancer 101.

This exception event notification has added thereto the server ID of the print server 102C. Upon receiving the exception event notification, the load balancer 101 excludes the print server 102C from candidates for a distribution destination of subsequent print data to be received from the user terminal 100.

In this way, no print data is distributed anymore from the load balancer 101 to the print server 102C, which is determined to perform abnormal operations by the image forming apparatus 103 based on the processing period T. Therefore, it is possible to continue normal operations of the printing system 1.

Furthermore, the exception event notification is transmitted from the image forming apparatus 103 directly to the load balancer 101 without via the print server 102C. Therefore, it is possible to transmit the exception event notification with no influence of the abnormal operations of the print server 102C. Even in this sense, it is possible to improve the fault-tolerant performance of the printing system 1.

(7-3) Examples of Operations in the Case where Occurrence of an Abnormality is Detected by the User 1300

The following explains an example of operations in the case where occurrence of an abnormality is detected by the user 1300.

Figure 15:
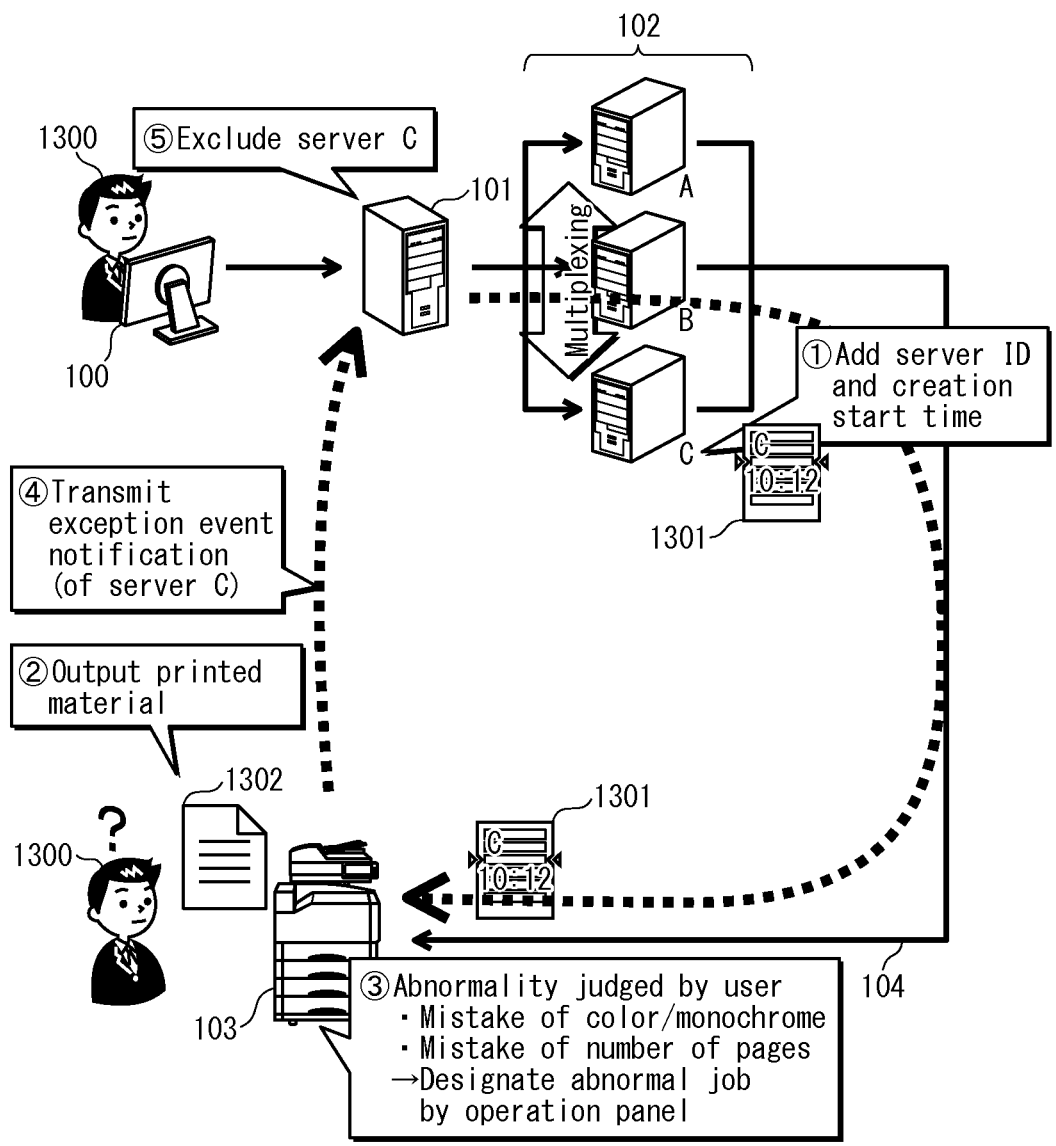
FIG. 15 shows an example of operations in the case where occurrence of an abnormality is detected by the user 1300.

As shown in FIG. 15, when the print server 102C receives the print job 1301, which has added thereto the server ID of the print server 102C and the creation start time of the print job 1301, the image forming apparatus 103 executes the print job 1301 and outputs the print material 1302, as described above.

The user 1300 checks the output printed material 1302. In the case where the printed material 1302 is a material printed under a print condition that is different from an initial print condition (color/monochrome, the number of pages, and so on), the user 1300 refers to the history list on the operation panel unit 1006, and presses the "Notify" button 1102 corresponding to the print job 1301 with respect to which occurrence of an abnormality is detected.

Such an abnormality is assumed to be a case where although an administrator of the printing system 1 originally should set the print server 102C to always output printed materials in monochrome under normal circumstances for the purpose of the reduction in running costs, color printing is actually performed due to a setting error caused by the administrator's artificial mistake. In this case, the print server 102C itself is normal, and the processing period T cannot be excessively long. For this reason, the image forming apparatus 103 has difficulty automatically detecting whether or not an abnormality has occurred, and accordingly it is effective to cause the user to perform abnormality detection.

When the image forming apparatus 103 transmits an exception event notification, which has added thereto the server ID of the print server 102C, to the load balancer 101 by the user operations such as described above, the load balancer 101 excludes the print server 102C from candidates for a distribution destination of subsequent print data to be received from the user terminal 100.

Even with this configuration, no print data is distributed anymore to the print server 102C with respect to which occurrence of an abnormality is detected. Therefore, it is possible to continue normal operations of the printing system 1. Also, since the print server 102C is immediately excluded from the candidates for a distribution destination of subsequent print data from the load balancer 101, it is possible to promptly recover the operations of the printing system 1 to the normal state.

[8] Modifications

Although the present invention has been explained based on the above embodiment, the present invention is not of course limited to the above embodiment. The present invention may include the following modifications.

(1) In the above embodiment, in order to shorten a first copy out time (FCOT), execution of a print job is started before determination as to the length of the processing period T. However, the present invention is of course not limited to this. Alternatively, the print job may be executed only in the case where occurrence of an abnormality is not detected from the length of the processing period T.

Occurrence of an abnormality in the print server 102 means that a print job has not been normally created. If the image forming apparatus 103 executes this print job, the image forming apparatus 103 might abnormally operate. In view of this, it is possible to avoid the image forming apparatus 103 from abnormally operating by executing only a print job that has been created by the print server 102 with respect to which occurrence of an abnormality is not detected.

(2) In the above embodiment, the explanation has been provided with use of the example where the load balancer 101, the print servers 102, and so on are each a physical machine. However, the present invention is of course not limited to this. Alternatively, the load balancer 101, the print servers 102, and so on are each a virtual machine.

Also, the load balancer 101, the print servers 102, and so on may not be connected to the LAN 104 which is used by the user. In other words, the same effect of the present invention is exhibited even in the case where the load balancer 101, the print servers 102, and so on are each used by the user as a cloud service.

Furthermore, a communication network used by the printing system 1 may be either wired or wireless. Moreover, the user terminal 100 is not limited to a PC, and alternatively may be any device that is capable of creating and transmitting print data to the load balancer 101. The user terminal 100 is for example a versatile terminal such as a smartphone and a tablet terminal, a desktop publishing (DTP) terminal, or the like. The present invention exhibits the effect irrespective of the types of the user terminals included in the printing system 1 and the communication network.

(3) In the above embodiment, the explanation has been provided with use of the example where the print data transmission unit 502 included in the load balancer 101 selects the print server 102 to which print data is to be distributed in a so-called round-robin manner. However, the present invention is of course not limited to this. Alternatively, the print server 102 as a distribution destination of print data may be selected in another manner.

For example, one of the print servers 102 that has the lowest processing load may be selected as a distribution destination of print data by monitoring the processing load on each of the print servers 102. The present invention exhibits the effect irrespective of the types of the method of selecting the distribution destination.

(4) Although no particular reference is made in the above embodiment, a communication address of the load balancer 101 that is necessary for transmitting an exception event notification may be set in the image forming apparatus 103 beforehand.

Also, in the case where the load balancer 101 is provided in plural in the printing system 1, an exception event notification, which has added thereto a server ID of a print server 102 with respect to which occurrence of an abnormality is detected, may be transmitted to all the load balancers 101. Then, only at least one load balancer 101 that has, as the candidates for the distribution destination, the print server 102 with respect to which occurrence of an abnormality is detected, excludes the print server 102, and other load balancers 101 may just discard the exception event notification.

Furthermore, a print job created by each of the print servers 102 may have attached thereto a communication address of a load balancer 101 that has the print server 102 as the candidates for the distribution destination. With this configuration, an exception event notification is transmitted only to the load balancer 101, which has, as the candidates for the distribution destination, the print server 102. Accordingly, it is possible to reduce the processing load on the LAN 104 and the processing load on the load balancers 101 which do not have the print server 102 as the candidates for the distribution destination, compared with the case where an exception event notification is transmitted to all the load balancers 101 by multicast, broadcast, or the like.

(5) In the above embodiment, the explanation has been provided with use of the example where abnormality detection is performed with use of the processing period T, which is the period from when the print server 102 starts creating a print job to when the image forming apparatus 103 receives the print job. However, the present invention is of course not limited to this. Alternatively, the following configuration may be used.

For example, the processing period T is determined to a period from when the print server 102 starts creating a print job to when the print server 102 completes creating the print job, and this processing period T is added to the print job instead of a print job creation start time.

With this configuration, it is possible to avoid the case where although no abnormality has occurred in the print server 102 itself, the print server 102 is excluded from candidates for a distribution destination of print data from the load balancer 101 due to a long processing period T, which is caused by reception delay of a print job influenced by congestion or the like on a communication path from the print server 102 to the image forming apparatus 103. Therefore, since it is possible to continuously operate more print servers 102, thereby maintaining a high processing efficiency of the whole printing system 1.

(6) In the above embodiment, the determination is made as to whether or not an abnormality has occurred in the print server 102 in accordance with whether or not the processing period T, which is the period from when the print server 102 starts creating a print job to when the image forming apparatus 103 receives the print job, is longer than the upper period U, which is calculated from the mean value μ and the standard deviation σ obtained from processing periods T of other print servers 102. However, the present invention is of course not limited to this. The upper period U may be set by the user or the administrator of the printing system 1, or may be determined by another method.

Also, the image forming apparatus 103 may determine whether or not an abnormality has occurred in the print server 102 with use of data other than the processing period T. The same effect of the present invention is exhibited irrespective of the types of the method of determining whether or not an abnormality has occurred in the print server 102.

(7) In the above embodiment, the explanation has been provided with use of the example where a server ID of the print server 102 that has created a print job and a print job creation start time of the print job are added to the print job. However, the present invention is of course not limited to this. Alternatively, the server ID and a creation start time of a job other than the print job may be added to the other job.

Also, a server device other than the print server 102 may be used. Specifically, the server device may add, to a job to be transmitted from the server device to a peripheral device other than the image forming apparatus 103, a server ID of the server device and a creation start time of the job. Then, in the case where occurrence of an exception event is detected with respect to the server device that has created the job, the peripheral device transmits an exception event notification having added thereto the server ID of the server device, and the server device is excluded from candidates for a distribution destination of subsequent print data from the load balancer 101. As a result, the same effect of the present invention is exhibited.

(8) In the above embodiment, the explanation has been provided with use of the example where the print server 102 with respect to which occurrence of an abnormality is detected is excluded from candidates for a distribution destination of subsequent print data from the load balancer 101 by transmitting an exception event notification from the image forming apparatus 103 to the load balancer 101 via the LAN 104. However, the present invention is of course not limited to this. Alternatively, the image forming apparatus 103 may transmit an exception event notification to the administrator of the printing system 1 via the LAN 104 to cause the administrator to change the candidates for the distribution destination of the subsequent print data from the load balancer 101.

This is because of the following reason: in the case where the processing efficiency of the whole printing system 1 might deteriorate due to for example exclusion of a large number of print servers 102 from candidates for the distribution destination of the subsequent print data from the load balancer 101, it is sometimes better to promptly recover the print server 102 to normal rather than to exclude the print server 102 with respect to which occurrence of an abnormality is detected from the candidates for the distribution destination.

From such a viewpoint, the following configuration may be used in which when the number of the print servers 102 that are candidates for a distribution destination of print data from the load balancer 101 is reduced to a predetermined reference number, the load balancer 101 may notify the administrator of the printing system 1 of this reduction.

(9) In the above embodiment, the explanation has been provided with use of the example where, with respect to a print server 102, a server ID, which is added to a print job by the print server 102, is identical with a server ID, which is added to an exception event notification by the image forming apparatus 103. However, the present invention is of course not limited to this. The same effect of the present invention is exhibited even if these server IDs different from each other. Note that the use of the identical server IDs realizes consistency of the system design in the whole printing system 1, thereby reducing mistakes in the system design and programming.

(10) Although no particular reference is made in the above embodiment, the image forming apparatus 103 may be either a color printer or monochrome printer. Alternatively, the image forming apparatus 103 may be a copy device having a scanning function or a facsimile device having a facsimile communication function. Further alternatively, the same effect of the present invention is exhibited even in the case where the image forming apparatus 103 is a multi-function peripheral (MFP) having these functions.

[9] Summary

As described above, one aspect of the present invention provides a printing system that includes a distribution apparatus, a plurality of print servers, and an image forming apparatus, where each time the distribution apparatus receives print data, the distribution apparatus distributes the print data to one of the print servers, the print server creates a print job from the print data and transmits the print job to the image forming apparatus, and the image forming apparatus executes the print job, wherein the print servers each comprise an identifier addition unit that adds an identifier of the print server to a created print job, the image forming apparatus comprises an exception event determination unit that, upon reception of a print job from one of the print servers, determines whether or not an exception event has occurred in the print server based on an identifier added to the print job, and the distribution apparatus comprises an exclusion unit that, when the exception event determination unit determines that an exception event has occurred in one of the print servers, excludes the print server from candidates for a distribution destination of a subsequent print job. With this configuration, in the case where an exception event has occurred in one of the print servers, the print server in which the exception event has occurred is excluded from candidates for a distribution destination of subsequent print data from the distribution apparatus. Therefore, it is possible to continue normal operations of the printing system with use of another print server in which no exception event has occurred.

In this case, the image forming apparatus may further comprise a notification unit that notifies the distribution apparatus of an identifier of one of the print servers with respect to which an exception event is determined to have occurred by the exception event determination unit, and upon reception of an identifier from the notification unit, the exclusion unit may exclude one of the print servers having the received identifier from the candidates.

Also, the print servers each may further comprise a time addition unit that adds, to a created print job, a creation start time of the print job, and the image forming apparatus may further comprises an excess determination unit that determines whether or not an elapsed period of a received print job exceeds a predetermined period, the elapsed period being from a creation start time added to the print job to a reception time of the print job, and when an elapsed period of a received print job is determined to exceed the predetermined period by the excess determination unit, the exception event determination unit may determine that an exception event has occurred in one of the print servers having an identifier added to the print job. With this configuration, in the case where a long period is necessary for one of the print servers to create a print job due to occurrence of any exception event, the print server is excluded from candidates for a distribution destination of subsequent print data from the distribution apparatus. As a result, since a print server with a low processing efficiency is excluded, it is possible to maintain a high processing efficiency of the whole printing system.

Also, the image forming apparatus may further comprise a reception unit that receives, from a user, a judgment result indicating whether or not an abnormality has occurred in a received print job, and when a judgment result received by the reception unit indicates that the abnormality has occurred in a received print job, the exception event determination unit may determine that an exception event has occurred in one of the print servers having an identifier added to the print job. With this configuration, even in the case where an abnormality such as a setting error caused by an artificial mistake, which is difficult for the image forming apparatus to automatically determine whether an abnormality has occurred, it is possible to detect occurrence of the abnormality with the user's help, thereby excluding the print server from candidates for a distribution destination of subsequent print data from the distribution apparatus. Therefore, it is possible to continue normal operations of the printing system.

Also, another aspect of the present invention provides an image forming apparatus that receives a print job from one of a plurality of print servers, and executes the print job, the print job being created from print data distributed to the print server from a distribution apparatus, the image forming apparatus comprising: a reception unit that receives, from one of the print servers, a print job to which an identifier of the print server is added; a printing execution unit that executes printing based on print data created from a received print job; an exception event determination unit that, upon reception of a print job from one of the print servers, determines whether or not an exception event has occurred in the print server based on an identifier added to the print job, and a notification unit that notifies the distribution apparatus of an identifier of one of the print servers with respect to which an exception event is determined to have occurred by the exception event determination unit.

Although the present invention has been fully described by way of examples with reference to the accompanying drawings, it is to be noted that various changes and modifications will be apparent to those skilled in the art.

Therefore, unless otherwise such changes and modifications depart from the scope of the present invention, they should be construed as being included therein.

What is claimed is:

1. A printing system that includes a distribution apparatus, a plurality of print servers, and an image forming apparatus, where each time the distribution apparatus receives print data, the distribution apparatus distributes the print data to one of the print servers, the one print server creates a print job from the print data and transmits the print job to the image forming apparatus, and the image forming apparatus executes the print job, wherein the print servers each comprise
an identifier addition unit that adds an identifier of each print server to a created print job,
the image forming apparatus comprises
an exception event determination unit that, upon reception of a print job from one of the print servers, determines whether or not an exception event has occurred in the one print server based on an identifier added to the print job, and
the distribution apparatus comprises
an exclusion unit that, when the exception event determination unit determines that an exception event has occurred in one of the print servers, excludes the one print server from candidates for a distribution destination of a subsequent print job.

2. The printing system of claim 1, wherein
the image forming apparatus further comprises
a notification unit that notifies the distribution apparatus of an identifier of one of the print servers with respect to which an exception event is determined to have occurred by the exception event determination unit, and
upon reception of an identifier from the notification unit, the exclusion unit excludes one of the print servers having the received identifier from the candidates.

3. The printing system of claim 1, wherein
the print servers each further comprise
a time addition unit that adds, to a created print job, a creation start time of the print job, and
the image forming apparatus further comprises
an excess determination unit that determines whether or not an elapsed period of a received print job exceeds a predetermined period, the elapsed period being from a creation start time added to the print job to a reception time of the print job, and
when an elapsed period of a received print job is determined to exceed the predetermined period by the excess determination unit, the exception event determination unit determines that an exception event has occurred in one of the print servers having an identifier added to the print job.

4. The printing system of claim 1, wherein
the image forming apparatus further comprises
a reception unit that receives, from a user, a judgment result indicating whether or not an abnormality has occurred in a received print job, and
when a judgment result received by the reception unit indicates that the abnormality has occurred in a received print job, the exception event determination unit determines that an exception event has occurred in one of the print servers having an identifier added to the print job.

5. An image forming apparatus that receives a print job from one of a plurality of print servers, and executes the print job, the print job being created from print data distributed to the one print server from a distribution apparatus, the image forming apparatus comprising:

a reception unit that receives, from one of the print servers, a print job to which an identifier of the one print server is added;

a printing execution unit that executes printing based on print data created from a received print job;

an exception event determination unit that, upon reception of a print job from one of the print servers, determines whether or not an exception event has occurred in the one print server based on an identifier added to the print job, and a notification unit that notifies the distribution apparatus of an identifier of one of the print servers with respect to which an exception event is determined to have occurred by the exception event determination unit.

6. A method for a printing system that includes a distribution apparatus, a plurality of print servers, and an image forming apparatus, where each time the distribution apparatus receives print data, the distribution apparatus distributes the print data to one of the print servers, the one print server creates a print job from the print data and transmits the print job to the image forming apparatus, and the image forming apparatus executes the print job, the method comprising:

adding an identifier of each print server to a created print job, determining, upon reception of a print job from one of the print servers, whether or not an exception event has occurred in the one print server based on an identifier added to the print job, and excluding, when it is determined that an exception event has occurred in one of the print servers, the one print server from candidates for a distribution destination of a subsequent print job.

7. The method of claim 6, further comprising:

notifying the distribution apparatus of an identifier of one of the print servers with respect to which an exception event is determined to have occurred, and upon reception of an identifier, excluding one of the print servers having the received identifier from the candidates.

8. The method of claim 6, further comprising:

adding, to a created print job, a creation start time of the print job, and determining whether or not an elapsed period of a received print job exceeds a predetermined period, the elapsed period being from a creation start time added to the print job to a reception time of the print job, and when an elapsed period of a received print job is determined to exceed the predetermined period, determining that an exception event has occurred in one of the print servers having an identifier added to the print job.

9. The method of claim 6, further comprising:

receiving, from a user, a judgment result indicating whether or not an abnormality has occurred in a received print job, and when a judgment result received indicates that the abnormality has occurred in a received print job, determining that an exception event has occurred in one of the print servers having an identifier added to the print job.

* * * * *